(12) United States Patent
Wilhelm (10) Patent No.: US 11,312,124 B2
(45) Date of Patent: Apr. 26, 2022

(54) METHOD AND APPARATUS FOR CONDITIONING A DATA CARRIER CONSTRUCTED AS A CARD-LIKE AND MULTILAYER LAMINATE FOR A SUBSEQUENT APPLICATION OF DATA

(71) Applicant: Mühlbauer GmbH & Co. KG, Roding (DE)

(72) Inventor: Stefan Wilhelm, Radeberg (DE)

(73) Assignee: Mühlbauer GmbH & Co. KG, Roding (DE)

( * ) Notice: Subject to any disclaimer, the term of this patent is extended or adjusted under 35 U.S.C. 154(b) by 181 days.

(21) Appl. No.: 16/514,457

(22) Filed: Jul. 17, 2019

(65) Prior Publication Data
US 2020/0023629 A1 Jan. 23, 2020

(30) Foreign Application Priority Data
Jul. 18, 2018 (DE) .................... 10 2018 117 350.4

(51) Int. Cl.
*B32B 38/00* (2006.01)
*B32B 38/18* (2006.01)
(Continued)

(52) U.S. Cl.
CPC .............. *B32B 38/004* (2013.01); *B32B 7/12* (2013.01); *B32B 38/1858* (2013.01);
(Continued)

(58) Field of Classification Search
CPC .............. B32B 38/004; B32B 38/1858; B32B 38/1866; B32B 7/12; B32B 2038/0064;
(Continued)

(56) References Cited

U.S. PATENT DOCUMENTS

| 5,746,864 A | 5/1998 | Reiter et al. | |
|---|---|---|---|
| 6,352,095 B1* | 3/2002 | Fulmer | B29C 53/18 156/387 |
| 2002/0135658 A1* | 9/2002 | Minowa | B41J 2/325 347/187 |

FOREIGN PATENT DOCUMENTS

| DE | 29608132 U1 | 8/1996 |
|---|---|---|
| DE | 60004154 T2 | 5/2004 |

(Continued)

OTHER PUBLICATIONS

JPH07256774 Machine Translation of Description (EPO/Google) (Year: 2021).*

(Continued)

*Primary Examiner* — Cynthia L Schaller
(74) *Attorney, Agent, or Firm* — Wood Herron & Evans LLP (57) ABSTRACT

Methods and a device are provided for conditioning, in particular smoothing, a data carrier constructed as a card-like and multi-layer laminate, in particular an RFID or NFC ticket, for a subsequent application of data, in particular by printing thereon. A simultaneous heating of the data carrier and application of pressure to a first main surface of the card-like data carrier takes place while the second main surface opposite the first main surface is in contact with an at least substantially flat support surface, to cause a reduction or elimination of a curvature of the data carrier which may have existed previously.

15 Claims, 3 Drawing Sheets

(51) Int. Cl.
*H04W 4/80* (2018.01)
*B32B 7/12* (2006.01)
(52) U.S. Cl.
CPC ........... *B32B 38/1866* (2013.01); *H04W 4/80* (2018.02); *B32B 2038/0064* (2013.01); *B32B 2425/00* (2013.01)
(58) Field of Classification Search
CPC ..... B32B 2425/00; B32B 27/08; B32B 29/08; B32B 2429/00; B32B 2307/75; B32B 2255/10; B32B 2519/02; B32B 2307/4023; B32B 2255/12; B32B 29/005; B32B 27/10; H04W 4/80; H04W 4/24; G06K 19/07722; G06K 19/077
See application file for complete search history.

(56) References Cited

FOREIGN PATENT DOCUMENTS

| | | | |
|---|---|---|---|
| JP | H07256774 | * | 10/1995 |
| JP | H11139052 A | | 5/1999 |

OTHER PUBLICATIONS

German Patent Office; Office Action in related German Patent Application No. DE 10 2018 117 350.4 dated Feb. 2, 2019; 9 pages.

* cited by examiner

METHOD AND APPARATUS FOR CONDITIONING A DATA CARRIER CONSTRUCTED AS A CARD-LIKE AND MULTILAYER LAMINATE FOR A SUBSEQUENT APPLICATION OF DATA

CROSS-REFERENCE TO RELATED APPLICATION

This application claims priority to German Patent Application Number 10 2018 117 350.4, filed Jul. 18, 2018, the entire disclosure of which is incorporated herein by reference.

TECHNICAL FIELD

The present invention relates to a method and an apparatus for conditioning, such as by smoothing, a data carrier constructed as a card-like and multi-layer laminate, such as an RFID or NFC ticket, for a subsequent application of data, such as by printing thereon, as well as a method and a device for this application of data, including the preceding conditioning.

BACKGROUND

Data carriers which are constructed in a card-like manner and as a multilayer laminate are used for a multitude of different applications. The group of these data carriers includes, in particular, such data carriers as access authorizations or admission tickets to rooms or areas of restricted access (e.g., offices or sports arenas, etc.) as well as price labels for goods which are equipped with radio functionality, in particular in accordance with the known RFID or NFC technologies. This radio functionality is typically located in one of the laminate layers or in a subset of the laminate layers of the data carrier, and can in particular be accommodated in an inlay which is arranged between an upper and a lower cover layer and which has corresponding transmitting/receiving devices.

In addition, the data carriers often have to carry visible data applied to at least one of their cover layers, which may be applied in particular by printing thereon. In the case of a price label this could be, for example, an indication of the price and/or an indication of the product, in the case of an admission ticket for example an indication of the event, a seat or standing location allocated to the ticket or a larger area and/or an event date.

During the manufacture of the data carrier as a laminate or during its subsequent intermediate storage or further processing, it is often the case that the data carrier, which is intended to be a flat card-like object, develops a curvature, whereby in particular "U"-shaped curvatures occur particularly frequently. However, such curvatures impede a subsequent process of applying the desired data to the data carrier, in particular by printing or laser inscription, and can in particular lead to a deterioration in the quality of the resulting representation of the data on the data carrier and thus in the product quality of the data carrier as a whole. In particular, distortions in the representation of the data may be the result. Additionally, in individual cases, the device which is used to apply the data, for example an ink print head, may even be damaged.

Thus, it would be desirable to provide a method and a device with which the product quality of a data carrier which is constructed as a card-like and multi-layer laminate, in particular the quality of the representation of data applied to it, can be improved.

SUMMARY

To achieve these objectives identified above, one embodiment of the invention includes a method of conditioning, in particular smoothing, a data carrier constructed as a card-like and multi-layer laminate, in particular an RFID or NFC ticket, for a subsequent application of data, in particular by printing thereon. The method includes (i) simultaneously heating the data carrier and subjecting a first main surface of the card-like data carrier to pressure, while the second main surface opposite the first main surface is in contact with an at least substantially flat support surface, in order to cause a reduction or elimination of a curvature of the data carrier which may have existed previously.

A "data carrier which is constructed as a card-like and multi-layer laminate" is intended to be understood to mean a sheet which in most cases—but not necessarily—is rectangular and which comprises a stack of a plurality of layers which are layered one above the other and which are connected to one another by lamination, and which is configured to receive data and to retain and make available the data at least temporarily for the subsequent acquisition by machine or by human senses. The data carrier may in particular comprise at least one layer of a paper material, such as for example thin cardboard. One or more of the layers may in particular also consist of plastic or contain the same. The data carrier can be provided with data in particular by handwritten markings or those made by machine, printing, perforations, selective surface changes (in particular material conversions which result in a color change) and/or can receive data by storing in a data storage device integrated in the data carrier, in particular an electronic or optical data memory. In this way, in particular RFID or NFC tickets, which in addition to such a data memory also have radio technology for wireless reading of the data from the data memory, are data carriers which are card-like and constructed as a multi-layer laminate in the sense of the invention.

Furthermore, personalized cards which are each constructed as a multi-layer laminate also form part of the group of such data carriers, to which, for example, ID cards and many types of chip cards, such as bank cards, credit cards, ID cards, membership cards and access authorization cards belong. The terms "personalization" or personalized" mean that the corresponding cards contain or carry data that is typically associated with a cardholder. In this sense, in some cases, for example, the data may identify the cardholder, for example by their name, an identity number or other features which are for example printed on the card or are otherwise applied to, or stored on, the card. In particular, the personalization can individually relate to a single person, or alternatively to a specific, limited group of people, such as employees of a company. In many cases, the personalized cards are plastic cards which are constructed as a laminate, e.g., they contain a predominant proportion of plastic, often they also consist essentially of it. The application of personalization data to the cards can take place, for example, by printing or engraving, or by a targeted local color change of the surface material due to the effect of energy, in particular by a suitable laser.

In another embodiment of the invention, a device is provided for conditioning, in particular smoothing, a data carrier which is constructed as a card-like and multi-layer laminate, in particular an RFID or NFC ticket, for a subsequent application of data, in particular by printing thereon, wherein the device is arranged to carry out the method in accordance with the first aspect of the invention.

In yet another embodiment of the invention, a method is provided of applying data, in particular by printing, to a data carrier which is constructed as a card-like and multi-layer laminate, in particular an RFID or NFC ticket. The method includes (i) conditioning the data carrier in accordance with the method according to the first aspect of the invention; and (ii) subsequently applying data to the conditioned data carrier. In embodiments of the devices corresponding thereto, the devices accordingly also comprise a data applying device, in particular a printing device, which is arranged to apply data to a data carrier which has previously been conditioned by the pressure generating device and the heating device. This method or the devices corresponding thereto thus enable an integrated process in which the data carrier, after its manufacture, is first conditioned in accordance with embodiments of the invention for the subsequent data application and the corresponding data is then applied to the conditioned data carrier. In total, in particular the quality of the generated data representation on the data carrier can thus be optimized and curvatures of the finished data carrier can at least largely be avoided.

By the methods mentioned above or the device mentioned above, a conditioning of a data carrier can take place, in which it is smoothed, in particular, which means that any curvatures of the data carrier that may be present and which may arise in particular during, or as a result of, its manufacture are reduced or, in an ideal case, eliminated. This can be achieved in particular by relaxing the mechanical tension in the data carrier which has been generated during the manufacture of the laminate. Such a relaxation effect can in particular be based on the fact that, by the conditioning, a moisture content is changed, in particular reduced, in the data carrier material as a whole or selectively in one or more layers of the laminate, and/or that adhesive bonds used in the course of the laminating process are subsequently modified, in particular softened, or their adhesive is chemically or physically modified, so that overall this results in a reduction or in the ideal case in a complete elimination of the tension, together with an associated smoothing of the data carrier. As a consequence, a subsequent application of data to the data carrier can be carried out by an application process the quality of which would be negatively influenced by a curvature of the data carrier, as would be the case, for example, with ink jet printing processes or with optical data application processes, for example by laser inscription or laser engraving, with improved quality in terms of the result.

In the following, several exemplary embodiments of the methods and the device are described, each of which can be combined with each other at will, unless this is expressly excluded or technically impossible.

The device in one aspect includes (i) a heating device for heating the data carrier; and (ii) a pressure generating device for subjecting a first main surface of the card-like data carrier to pressure simultaneously with the heating, while the second main surface opposite the first main surface is in contact, at least in sections, with an at least substantially flat support surface. The heating device and the pressure generating device are arranged to act simultaneously on the data carrier in order to cause a reduction or elimination of any previously existing curvature of the data carrier.

In one aspect, the heating is effected by selectively applying supplied heat to that one of the two main surfaces whose curvature in the plan view onto this main surface in the direction of the support surface located behind it has an at least substantially convex shape, e.g., has an outward curvature in a direction opposite the direction of view.

The term "selective application" of supplied heat to the corresponding main surface is intended to mean, in the sense of the invention, that the application, in particular the supply of heat, is at least predominantly, preferably exclusively, applied to this main surface. In embodiments of the device corresponding thereto, the heating device is accordingly arranged to selectively apply supplied heat only, or at least predominantly, to one of the two main surfaces of the data carrier. In this sense, the heating device may in particular be arranged (i) to selectively apply supplied heat only, or at least predominantly, to the one of the two main surfaces of the data carrier which faces towards the support surface or, as an alternative to this, (ii) to selectively apply supplied heat only, or at least predominantly, to the one of the two main surfaces of the data carrier which faces away from the support surface.

In this way, an advantageous conditioning, in particular smoothing, of the data carrier can be achieved successfully if, by the selective application, the spatial extent of the main surface which is subjected to the selective application is reduced relative to the other main surface, as may be the case in particular by removal of moisture. This is often the case in particular with such data carriers in which the main surface which is subjected to the selective application consists of a paper-containing material, such as a thin cardboard layer, which shrinks when moisture is removed.

In another aspect, the heating of the data carrier by a heat carrier medium heated to at least 300° C., preferably to at least 350° C., takes place while it is simultaneously subjected to the application of pressure. In embodiments of the devices corresponding to this, the heating device is accordingly arranged to subject the data carrier to be supplied heat by a heat carrier medium which is heated to at least 300° C., preferably to at least 350° C., while it is simultaneously subjected to the application of pressure. It has been found that, in the case of the materials typically selected for the production of the data carriers mentioned above (in particular paper, cardboard, plastic and/or laminating adhesives), particularly good smoothing results can be achieved by heating the data carrier within the framework of the method to temperatures at or above, in particular in the vicinity of the lower temperature thresholds mentioned above. Preferably, however, the temperatures are additionally kept below an upper predetermined temperature threshold, in particular an upper material-dependent predetermined temperature threshold, above the lower temperature threshold in order to ensure an at least largely non-destructive conditioning. An upper temperature threshold of a maximum of 150° C. for data carriers with paper-like components and of a maximum of 100° C. for laminates made of purely plastic-containing layers has proved to be particularly advantageous.

In a further aspect, the heat carrier medium is at the same time used as a means for applying pressure to the data carrier. In embodiments of the devices corresponding to this, the devices are accordingly arranged to use the heat carrier medium at the same time to apply pressure to the data carrier by the pressure generating device. In one variant the heat carrier medium may in particular comprise at least one roller which is arranged to apply the pressure to the data carrier and at the same time to supply heat to it. For this purpose the at least one roller may itself comprise the heating device or may be configured to be heated by it. According to another variant, the heat carrier medium may in particular be a gas, in particular air, which is heated by the heating device and which is guided, in particular blown, under pressure onto the data carrier by a pressure generating device, e.g., a blower, in order simultaneously to apply pressure and supplied heat to the data carrier. In this way, a particularly efficient solution, in particular a particularly space-saving solution, can be implemented due to the dual function of the heat carrier medium.

In yet another aspect, the data carrier is subjected to the pressure by a roller arrangement comprising a plurality of rollers. In embodiments of the devices corresponding to this, their respective pressure generating devices accordingly comprises a roller arrangement comprising a plurality of rollers. In this way, the data carrier can be subjected to pressure in a manner distributed over a large area, in particular over a larger surface proportion, preferably its entire surface, which can be used to achieve a particularly uniform conditioning, in particular smoothing.

In some embodiments, in which at least one roller or an arrangement of a plurality of rollers is provided, this roller or these rollers is/are made of metal and/or silicone rubber and/or coated with silicone rubber. Silicone rubber is particularly suitable as a roller material as it achieves good temperature distribution and mechanically gentle conditioning of the data carrier and at the same time exhibits high temperature resistance and adhesive resistance.

In one aspect, the rollers of the roller arrangement are arranged offset relative to one another in such a way that an intermediate space respectively remains between the individual rollers and the heating of the data carrier is carried out at least partially by the data carrier being supplied with a heated gaseous heat carrier medium, in particular hot air, or with electromagnetic radiation suitable for non-destructive heating of the data carrier, in particular from the infrared and/or visible range of the electromagnetic spectrum, through at least one of these intermediate spaces. In the embodiments of the devices corresponding to this, their heating device is arranged accordingly to supply the data carrier resting on the support surface with the heated gaseous heat carrier medium or with the electromagnetic radiation suitable for non-destructive heating of the data carrier through at least one of these intermediate spaces. In this way, the advantages of an application of pressure and of a heat supply distributed over the surface of the data carrier can be achieved in a particularly efficient way. Also with these embodiments, the rollers of the roller arrangement can optionally be heated or be heatable.

For other embodiments with a different roller arrangement, instead of, or in addition to, the offset rollers, rollers are used whose width, at least approximately, corresponds to, or exceeds, that of the data carrier so that the respective roller can act on the data carrier over the entire surface by pressure and, additionally, heat supply, if applicable.

In another aspect, the support surface is formed by a vacuum belt, at least in sections. In accordance with the method, the data carrier is additionally subjected to suction by the vacuum belt during heating and the application of pressure. In embodiments of the devices corresponding to this, the vacuum belt is accordingly arranged additionally to subject the data carrier to suction while it is being heated and subjected to pressure. The vacuum belt can be advantageously used in particular to hold the data carrier in position during its conditioning and to transport it within the framework of the process. Typically, the more the conditioning process, in particular the smoothing, has advanced, the more pronounced the holding effect is for the same suction power.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrates one or more embodiments of the invention and, together with the general description given above and the detailed description given below, explains the one or more embodiments of the invention.

DETAILED DESCRIPTION

In the figures, the same reference signs are used throughout for the same or corresponding elements of the invention.

Figure 1A:
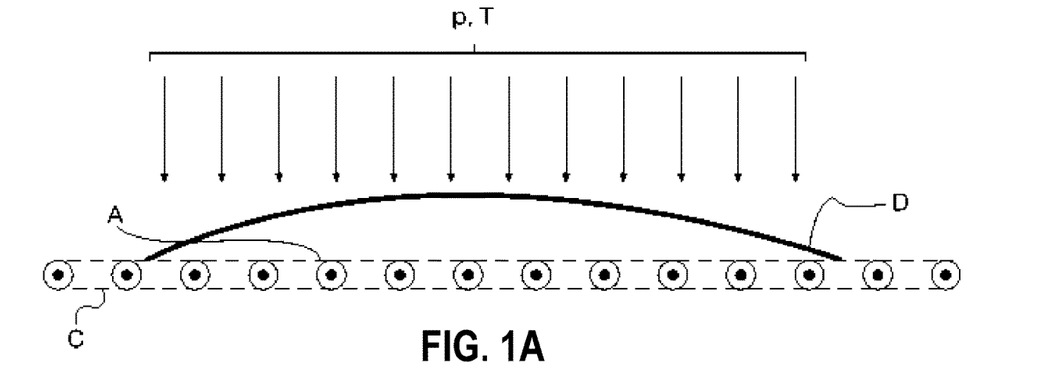
FIG. 1A is a schematic illustration of a first variant of the method for the application of data (including conditioning) according to one embodiment of the invention.

FIG. 1A illustrates a first variant of a method in accordance with an embodiment of the invention for conditioning a data carrier D which initially has a curvature, in which method the data carrier D is initially arranged on a support surface A of a vacuum belt C and is held there by a corresponding suction by the vacuum belt C in such a way that its curvature, when the data carrier D is viewed from above and is viewed in the direction towards the support surface A located behind—or here located underneath—(e.g., when viewed from "above" along the direction of the arrows in FIG. 1A) has a convex shape, such as curved outwards (e.g., against the direction of view). In accordance with the method, the data carrier D is simultaneously subjected both to a pressure p and to a selective supply of heat T to that one of its main surfaces which faces away from the support surface in order to cause a conditioning, in particular a smoothing, of the data carrier D. The heat carrier medium used for the supply of heat preferably has a temperature of at least 300° C., preferably at least 350° C. The vacuum belt C serves not only as support surface A for the data carrier D, but also for its transport, in particular before and after the conditioning process. In some variants of the method, the conditioning can also be carried out simultaneously with the transport.

Figure 1B:
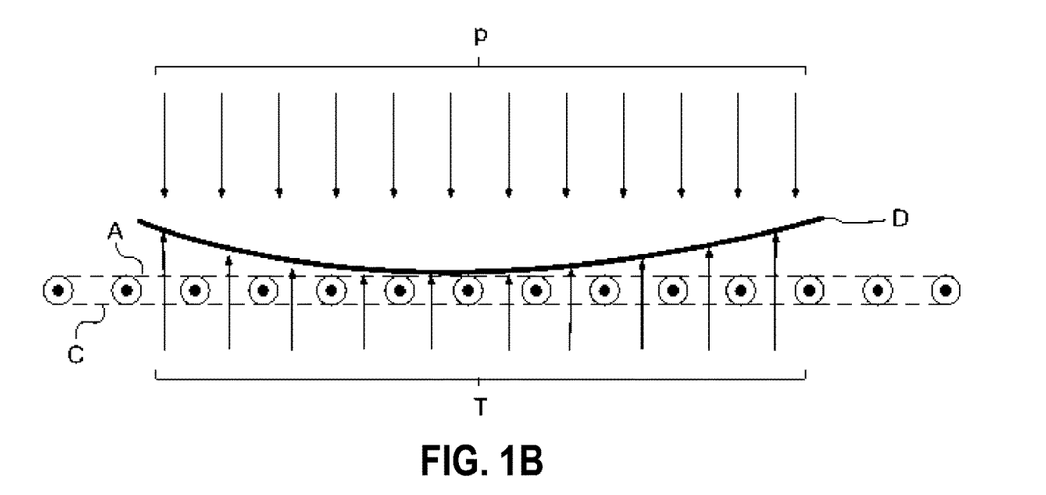
FIG. 1B is a schematic illustration of a second variant of the method for the application of data (including conditioning) according to another embodiment of the invention.

FIG. 1B illustrates a second variant of a method for conditioning a data carrier D initially having a curvature in accordance with an embodiment of the invention which is alternative to FIG. 1A, in which method the data carrier D is initially arranged on a support surface A of a vacuum belt C and is held there by a corresponding suction by the vacuum belt C in such a way that its curvature, when the data carrier D is viewed from above and is viewed in the direction towards the support surface A located behind—or here located underneath—(e.g., when viewed from "above" along the direction of the arrows in FIG. 1A) has a concave shape, such as curved inwards. In contrast to the variant shown in FIG. 1A, the application of pressure p and a heat supply T are carried out from different directions, in particular opposite directions, so that the main side of the data carrier D which faces away from the support surface A is exposed to the pressure p and the main side of the data carrier D facing it is exposed to the temperature supply T. What the two variants from FIG. 1A and FIG. 1B have in common is that the heat supply T is always applied selectively to that one of the two main sides of the data carrier which has an outward curvature in the direction of this heat supply. This represents a particularly effective method for achieving the desired conditioning, in particular smoothing, of the data carrier D, in particular if the conditioning can be effected at least partially by removing moisture from the layer lying underneath the main surface to which heat is selectively applied and the accompanying shrinkage thereof, as can often be the case, in particular, with layers formed by a paper material. The arrows in FIGS. 1A and 1B respectively represent the application of the data carrier D with pressure p and heat T respectively supplied along the corresponding arrow direction.

Figure 1C:
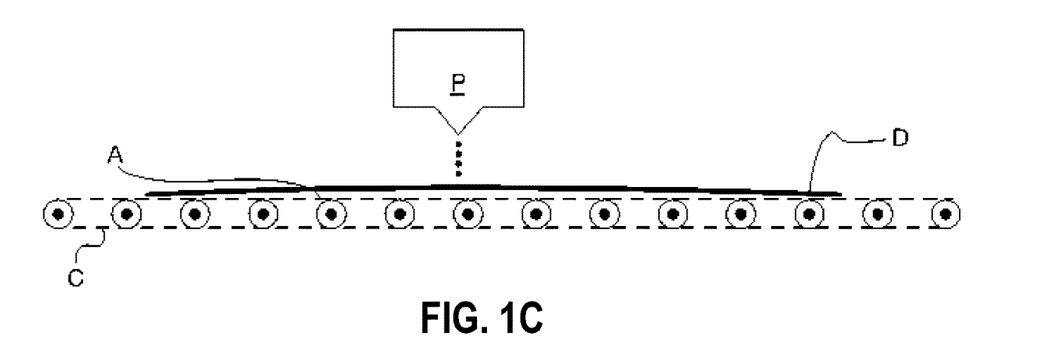
FIG. 1C is a schematic illustration of a third variant of the method for the application of data (including conditioning) according to a further embodiment of the invention.

FIG. 1C finally illustrates a further process step following conditioning, in which printing is applied to the previously conditioned data carrier D by ink jet printing through an ink jet print head P and the data carrier D is thus provided with printed data. Alternatively or in addition to this, in particular thermal transfer printing or dye sublimation printing can also be used to print on the data carrier. Although this process step is shown in FIG. 1C as a subsequent step to the first variant of conditioning illustrated in FIG. 1A, it can in particular also be used in combination with the second variant from FIG. 1B.

Figure 2:
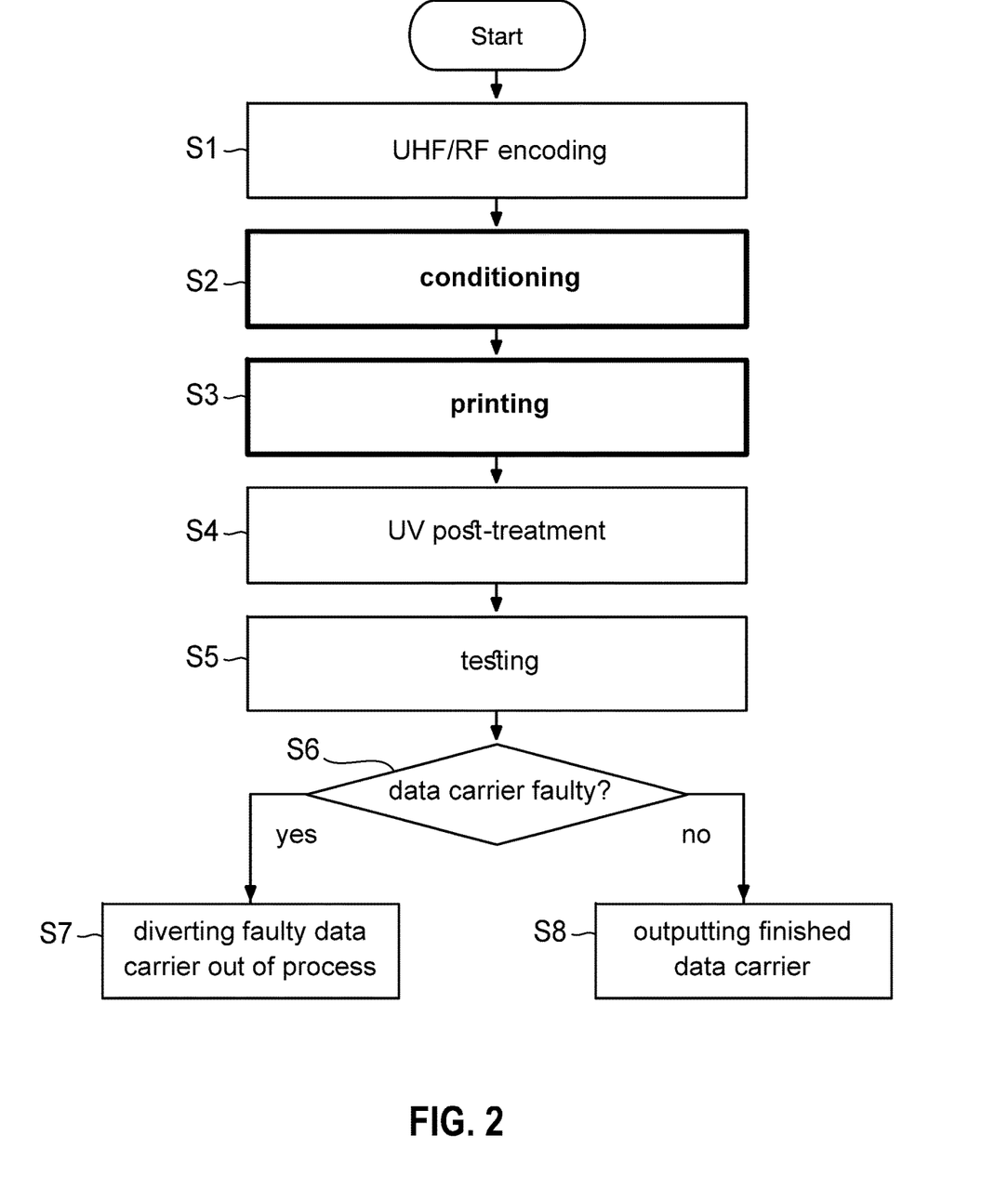
FIG. 2 is a flowchart illustrating several steps of the method of the various embodiments of the invention within the framework of an overall process for the application of data to a data carrier in the form of an RFID ticket.

FIG. 2 shows a flow chart in order to illustrate a preferred embodiment of the method in accordance with the invention within the framework of an overall process for applying data to a data carrier in the form of an RFID ticket with an RFID transponder constructed as an inlay.

The data carrier D which has already been completed as a laminate, that is, more precisely, its RFID transponder, is first provided with a predetermined, preferably unique code in a known manner in a step S1 by suitable encoding using ultra-high frequency (UHF) or high frequency (HF) signals suitable for this purpose, on the basis of which the RFID ticket can later be identified and distinguished from other RFID tickets. Then, in step S2, the conditioning of the data carrier is carried out as described herein, in particular as already illustrated with reference to FIGS. 1A and 1B, in order to reduce or ideally completely eliminate any curvature that the data carrier may have.

This is followed in step S3 by an application of data, which—as shown here—can in particular be carried out by applying printing to the data carrier, in particular in accordance with the inkjet printing process schematically shown in FIG. 1C. Optionally, in particular the steps S4 to S8 explained in the following can also follow. In step S4, the data carrier is subjected to a post-treatment with ultraviolet (UV) radiation, which can in particular serve to cure adhesives present in the laminate or other UV-sensitive components of the laminate. The ink can also be dried in the course of this. This can then be followed by a test step S5, in which the data carrier is inspected or tested, in particular with regard to its functionality and/or any damage and/or the quality of the print applied in step S3, for example by automatic image recognition methods. In addition, or as an alternative, the test may also include a wireless test to determine whether the coding is correct. A correct coding can manifest itself in particular by the fact that it corresponds to the printed data. If this check shows that the data carrier D is faulty (S6—yes), it is diverted out of the process in step S7 as a faulty item. Otherwise (S6—no), the finished and checked data carrier D is output as error-free.

Figure 3:
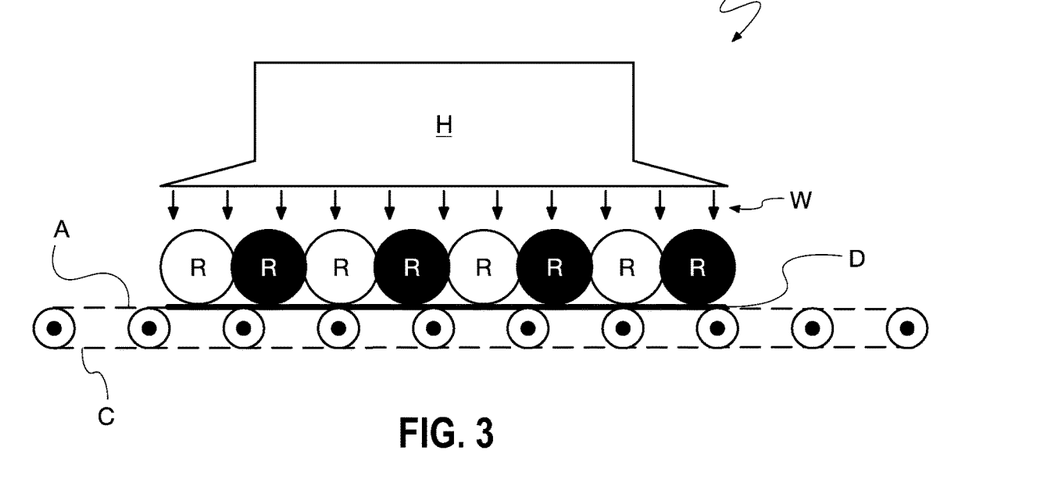
FIG. 3 is a side view of a device for conditioning a data carrier in accordance with one embodiment of the invention.

FIG. 3 shows a schematic side view of a device V for conditioning a data carrier in accordance with an embodiment of the invention. The device V again comprises a vacuum belt C, which is a conveyor belt which is at the same time constructed to generate a negative pressure and to apply suction, via openings in the conveyor belt, to a data carrier D located thereon and thus to fix it on the belt C so that the belt C represents a support surface A for the data carrier D. The device V further comprises a roller assembly with a plurality of rollers R which are offset with respect to one another, each of which is configured to exert a pressure, in the direction of the support surface A, on a data carrier D arranged on the support surface A of the vacuum belt C. In addition, the device V has a heating device H, which is arranged next to the roller arrangement in such a way that it can emit, through the roller arrangement and onto a data carrier D located between the rollers R and the support surface A, a hot air flow serving as a heat carrier medium W and can thus supply heat T to this data carrier. The device V is thus capable of simultaneously applying, to the data carrier D, the pressure exerted by the roller arrangement serving as the pressure generating device and the heat T supplied by the heating device H, in order to thereby effect a conditioning, in particular a smoothing, of the data carrier D. In accordance with the method illustrated in FIG. 1A, the device V is thus configured to apply both pressure p and heat T to the data carrier D, or more precisely to its main side facing away from the support surface A, from the same direction. The rollers R can additionally be heated.

Figure 4:
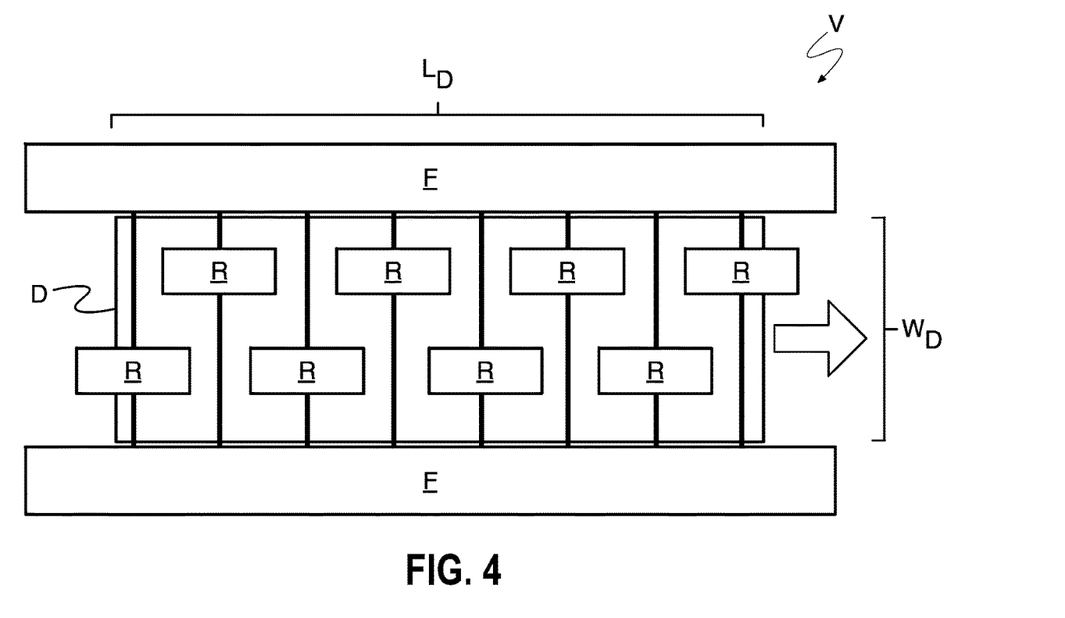
FIG. 4 is a top plan view of a roller arrangement included in the device of FIG. 3.

Finally, FIG. 4 shows a plan view of the roller arrangement of the device V from FIG. 3 (whereby the heating device H is not shown), in which the offset arrangement of the rollers R, which are each mounted rotatably about an associated axis running between two guide rails F parallel to one another, is clearly visible. The roller arrangement is dimensioned in such a way that its longitudinal extent along the transport direction of the data carrier D, indicated by the case illustrated, corresponds at least substantially to, or exceeds, the longitudinal extent LD of the data carrier. Further, the roller arrangement is dimensioned in such a way that its transverse extent which extends perpendicular to the transport direction corresponds at least substantially to the width WD of the data carrier D, or is slightly less, so that at least the predominant part, preferably at least 75% of the surface of the data carrier D is subjected to pressure directly by at least one of the rollers R during its passage under the roller arrangement. In this way, an application of pressure p and heat supply T which is distributed over the entire data carrier surface D can be achieved, and thus a conditioning, in particular a smoothing, which is as uniform as possible.

A further advantage of the roller arrangement shown is the fact that intermediate spaces remain between the individual rollers R, through which the heat carrier medium flow W emitted by the heating device H can be passed through the roller arrangement to the data carrier D in a simple and, in particular, space-saving manner.

In addition or instead of the heat carrier medium flow W emitted by the heating device H, the rollers R can be constructed for the application of pressure and, in a dual function, at the same time also for the application of heat T to the data carrier D. For this purpose, at least some of the rollers R can be such that they can be heated, especially electrically.

While embodiments have been described above in which data is applied to the data carrier D by ink jet printing, thermal transfer printing and dye sublimation printing, other printing techniques can alternatively or additionally be used. For example, data can be applied by stamping, such as rubber stamping. Without limitation, rocking stamps or roller stamps can be used for this purpose. These stamps may apply data to the data carrier D as the data carrier is transported past them, for example by the vacuum belt C. In particular, in the case of a roller stamp, the stamp may remain substantially stationary during the printing process, with only the roller of the roller stamp rotating. If a rocker stamp is used, this may be mounted so as to be pivotable about an axis which axis remains substantially stationary during the printing process. Alternatively, a stamp with a substantially flat stamp plate can be used. In particular when using such a stamp, the data carrier may be kept stationary during the printing process. Alternatively, if the data carrier is not kept stationary during the printing process, for example since it is transported by the vacuum belt during the printing process, the stamp could carry out a corresponding movement (e.g., it could be mounted on a mechanism which moves the stamp in parallel to the data carrier) during be printing process so that, at least during the printing process, the data carrier and the stamp are substantially stationary relative to one another.

The embodiments described above are only descriptions of preferred embodiments of the present invention, and are not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

REFERENCE CHARACTERS

D data carrier, in particular RFID or NFC ticket
LD length of the data carrier
WD width of the data carrier
V device for conditioning a data carrier
A support surface
C vacuum belt
F guide rails
H heating device
P ink print head
p application of pressure
R roller, or roller arrangement as a whole
T heat supply
W heat carrier medium, in particular hot air flow

What is claimed is:

1. A method of conditioning a data carrier, constructed as a card-like and multi-layer laminate, for a subsequent application of data, the method comprising:
    simultaneously heating the data carrier and subjecting a first main surface of the card-like data carrier to pressure, while a second main surface opposite the first main surface is in contact with an at least substantially flat support surface, to cause a reduction or elimination of a curvature of the data carrier which may have existed previously;
    wherein a heat carrier medium is used to heat the data carrier and to apply pressure to the data carrier so as to subject the first main surface of the card-like data carrier to pressure.

2. The method of claim 1, wherein, in a plan view onto the first main surface in a direction in which the support surface is located behind the first main surface, the first main surface has an at least substantially convex shape;
    wherein the heating is effected by selectively applying heat to the first main surface of the data carrier.

3. The method of claim 1, wherein the support surface is formed by a vacuum belt, at least in sections, and the data carrier is additionally subjected to suction by the vacuum belt during heating and the application of pressure.

4. The method of claim 1, wherein the conditioning of the data carrier is a smoothing of the data carrier, and wherein the card-like and multi-layer laminate is defined by an RFID or a NFC ticket.

5. A method of conditioning a data carrier, constructed as a card-like and multi-layer laminate, for a subsequent application of data, the method comprising:
    simultaneously heating the data carrier and subjecting a first main surface of the card-like data carrier to pressure, while a second main surface opposite the first main surface is in contact with an at least substantially flat support surface, to cause a reduction or elimination of a curvature of the data carrier which may have existed previously,
    wherein the heating of the data carrier is performed by a heat carrier medium heated to at least 300° C.

6. The method of claim 5, wherein the heating of the data carrier is performed by the heat carrier medium, which is heated to at least 350° C.

7. The method of claim 5, wherein the support surface is formed by a vacuum belt, at least in sections, and the data carrier is additionally subjected to suction by the vacuum belt during heating and the application of pressure.

8. The method of claim 5, wherein the conditioning of the data carrier is a smoothing of the data carrier, and wherein the card-like and multi-layer laminate is defined by an RFID or a NFC ticket.

9. A method of conditioning a data carrier, constructed as a card-like and multi-layer laminate, for a subsequent application of data, the method comprising:
    simultaneously heating the data carrier and subjecting a first main surface of the card-like data carrier to pressure, while a second main surface opposite the first main surface is in contact with an at least substantially flat support surface, to cause a reduction or elimination of a curvature of the data carrier which may have existed previously,
    wherein the data carrier is subjected to the pressure by a roller arrangement comprising a plurality of rollers; and
    wherein the rollers of the roller arrangement are arranged offset relative to one another in such a way that an intermediate space respectively remains between the individual rollers, and the heating of the data carrier is carried out at least partially by the data carrier being supplied with a heated gaseous heat carrier medium or with electromagnetic radiation suitable for non-destructive heating of the data carrier through at least one of these intermediate spaces.

10. The method of claim 9, wherein the support surface is formed by a vacuum belt, at least in sections, and the data carrier is additionally subjected to suction by the vacuum belt during heating and the application of pressure.

11. The method of claim 9, wherein the conditioning of the data carrier is a smoothing of the data carrier, and wherein the card-like and multi-layer laminate is defined by an RFID or a NFC ticket.

12. A device for conditioning a data carrier which is constructed as a card-like and multi-layer laminate, for a subsequent application of data, the device comprising:
- a heating device for heating the data carrier; and
- a pressure generating device for subjecting a first main surface of the card-like data carrier to pressure simultaneously with the heating, while a second main surface opposite the first main surface is in contact, at least in sections, with an at least substantially flat support surface;
- wherein the heating device and the pressure generating device are arranged to act simultaneously on the data carrier to cause a reduction or elimination of any previously existing curvature of the data carrier;
- wherein the heating device is arranged to subject the data carrier to heat using a heat carrier medium and the pressure-generating device is arranged to use the heat carrier medium at the same time to apply pressure to the data carrier,
- wherein the heating device is arranged to subject the data carrier to heat using said heat carrier medium, the heat carrier medium being heated to at least 300° C.

13. The device of claim 12, wherein the heat carrier medium is heated to at least 350° C.

14. The device of claim 12, wherein the support surface is formed by a vacuum belt, at least in sections, which is arranged to additionally subject the data carrier to suction during application of heating and pressure onto the data carrier.

15. The device of claim 12, further comprising a data applying device, which is defined by a printing device, and which is arranged to apply data to the data carrier which has previously been conditioned by the pressure generating device and the heating device.

* * * * *